P. WELIN.
PNEUMATICALLY CONTROLLED MUSIC PLAYING DEVICE.
APPLICATION FILED FEB. 5, 1907.
1,063,898.
Patented June 3, 1913.
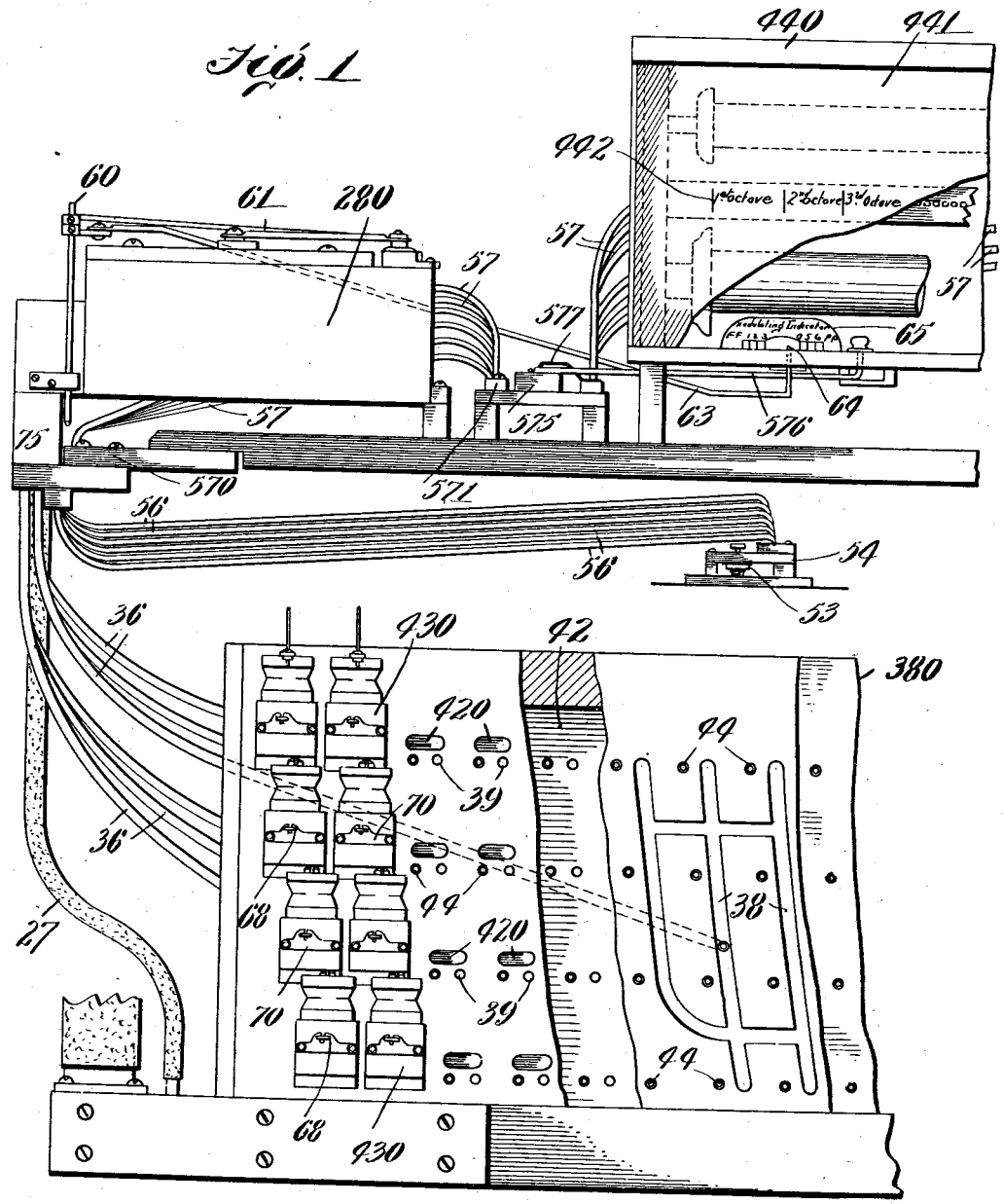

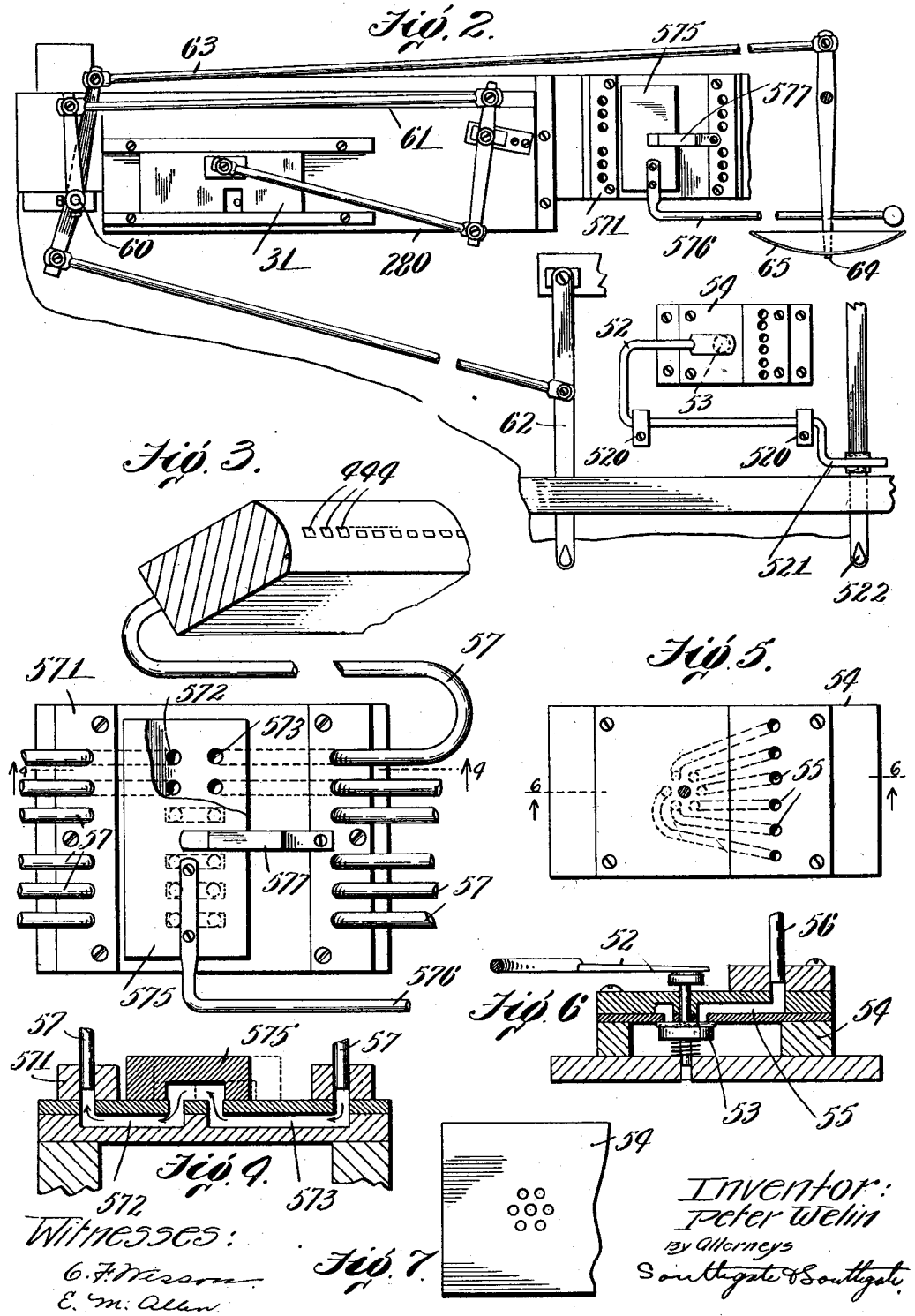

P. WELIN.
PNEUMATICALLY CONTROLLED MUSIC PLAYING DEVICE.
APPLICATION FILED FEB. 5, 1907.
1,063,898.
Patented June 3, 1913.
9 SHEETS—SHEET 3.
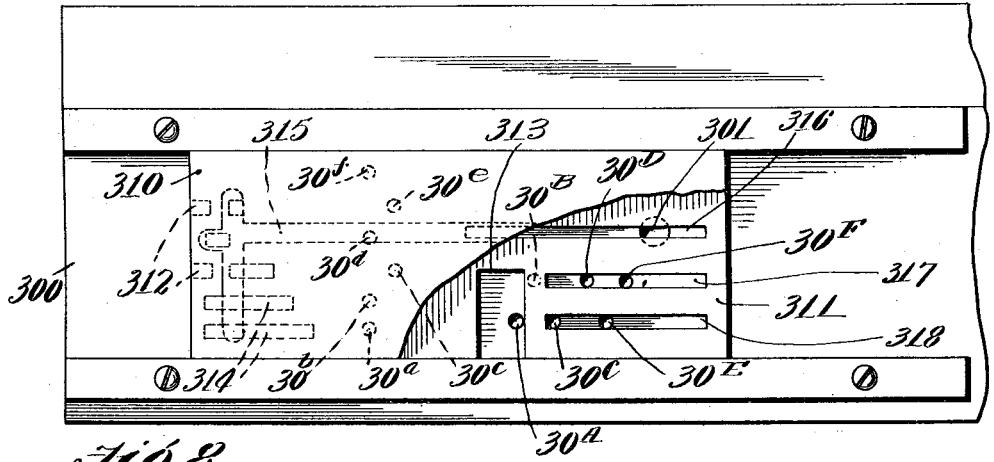
Fig. 8.
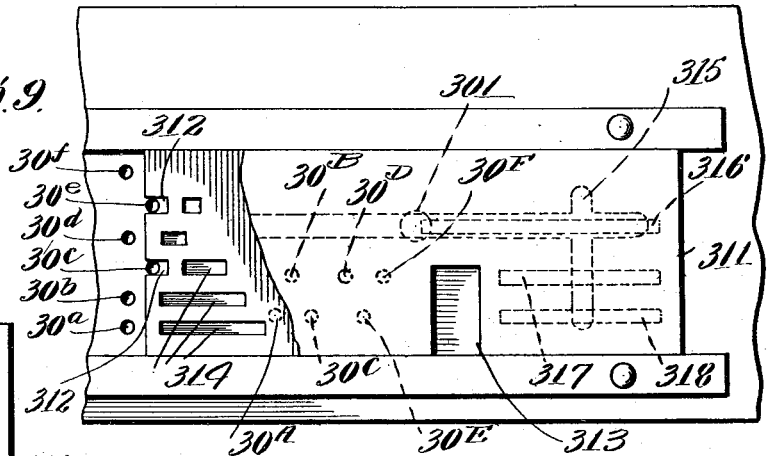
Fig. 9.
Fig. 10.
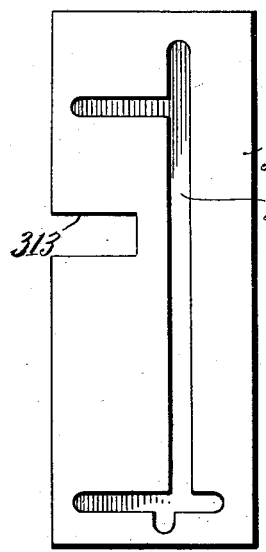
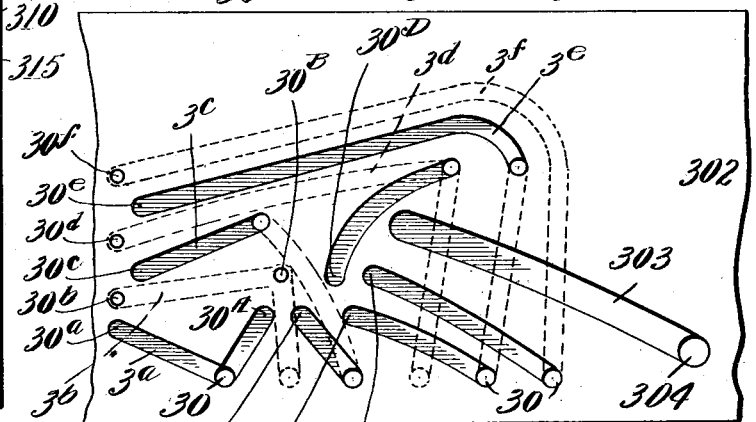
Fig. 11.
Witnesses:
Inventor:
Peter Welin
by Attorneys
Southgate & Southgate

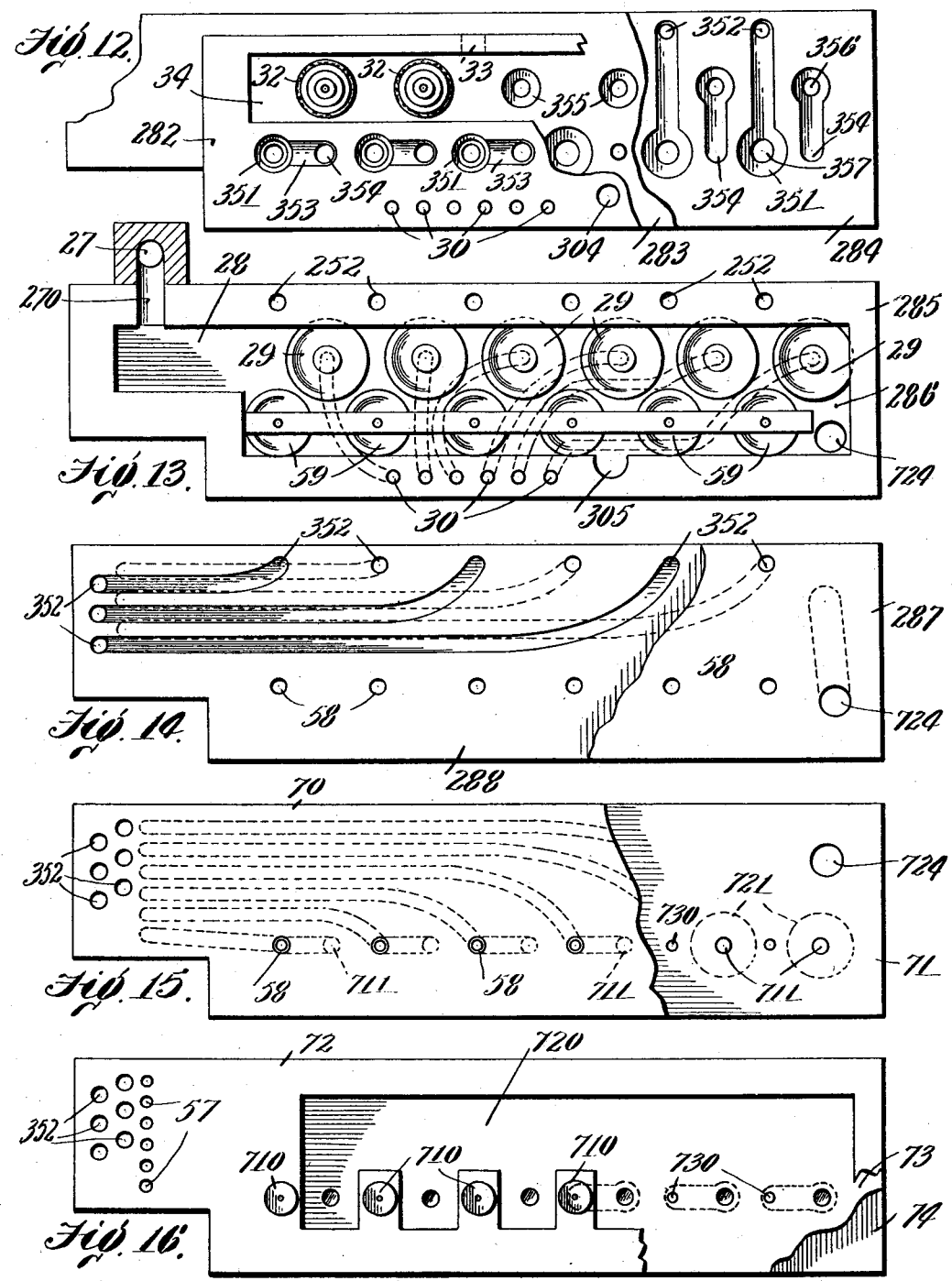

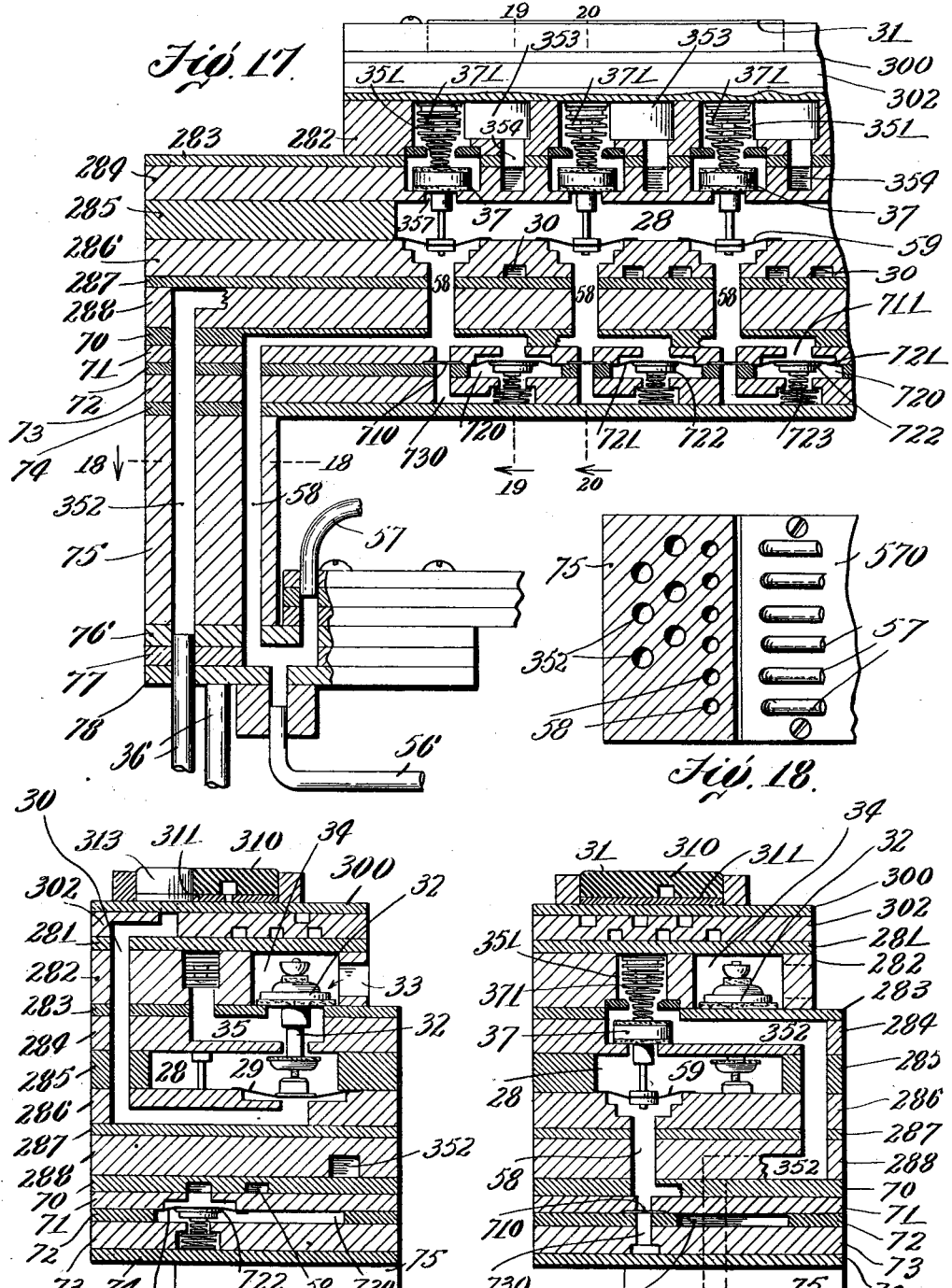

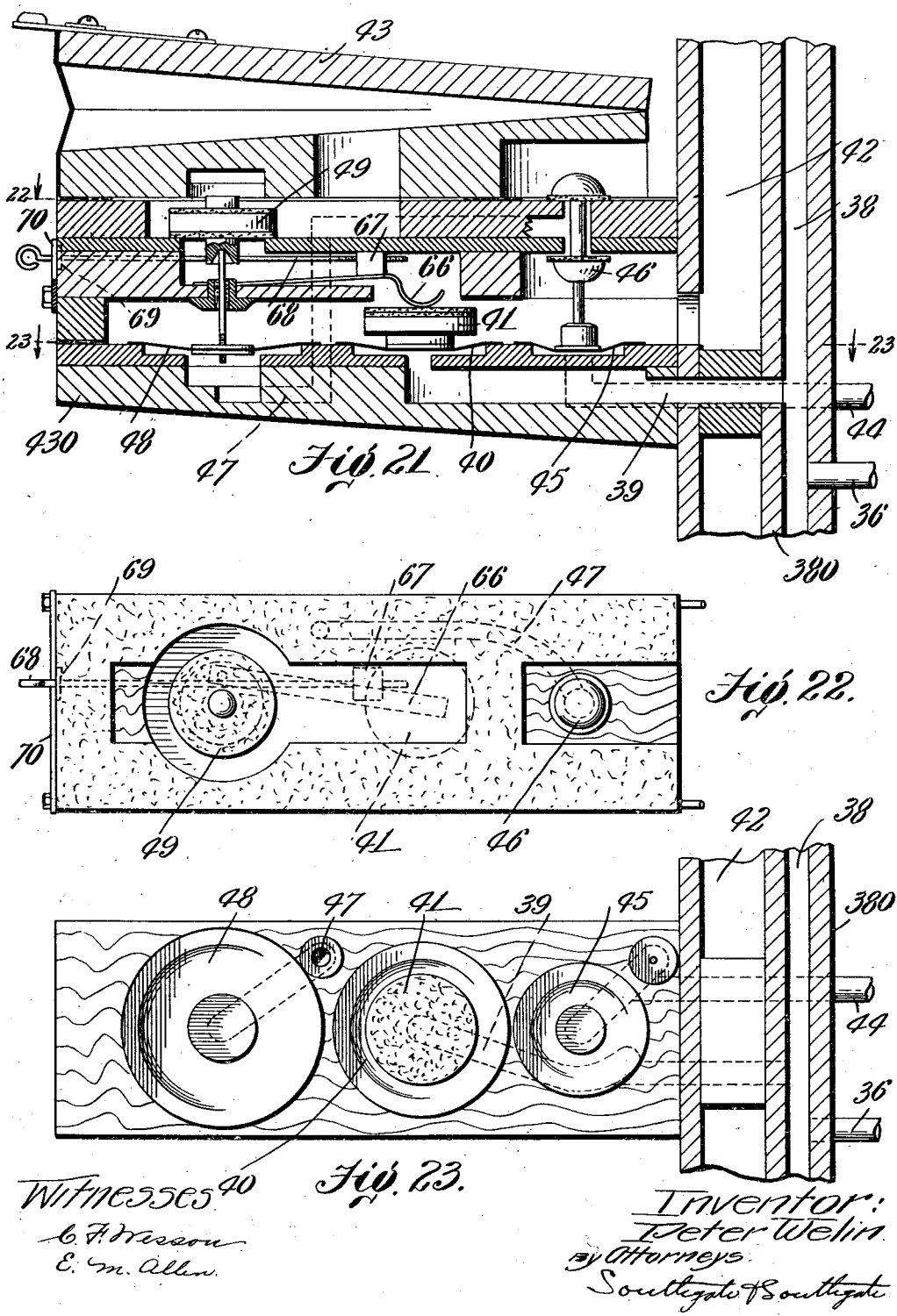

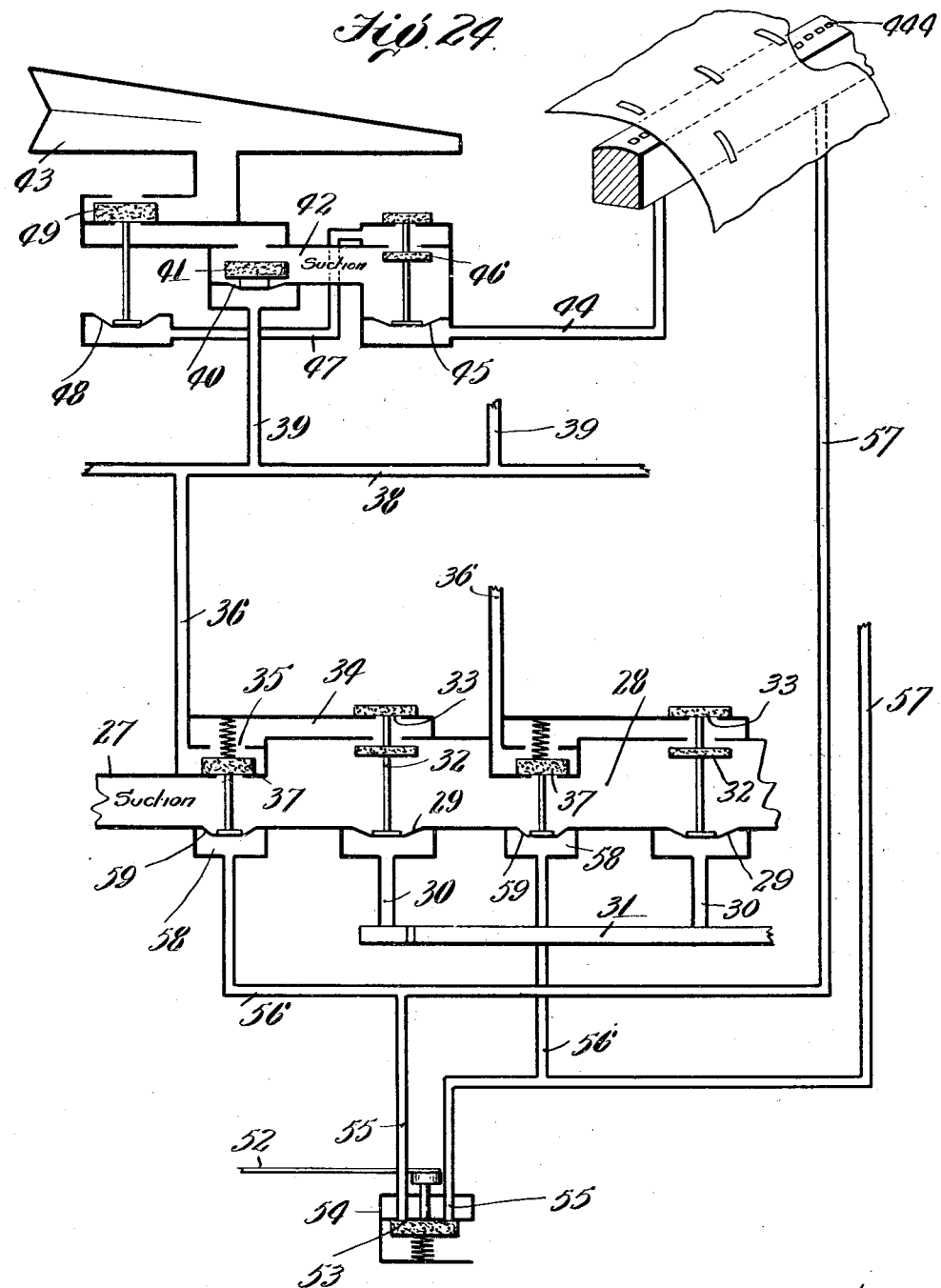

P. WELIN.
PNEUMATICALLY CONTROLLED MUSIC PLAYING DEVICE.
APPLICATION FILED FEB. 5, 1907.
1,063,898.
Patented June 3, 1913.
9 SHEETS—SHEET 8.
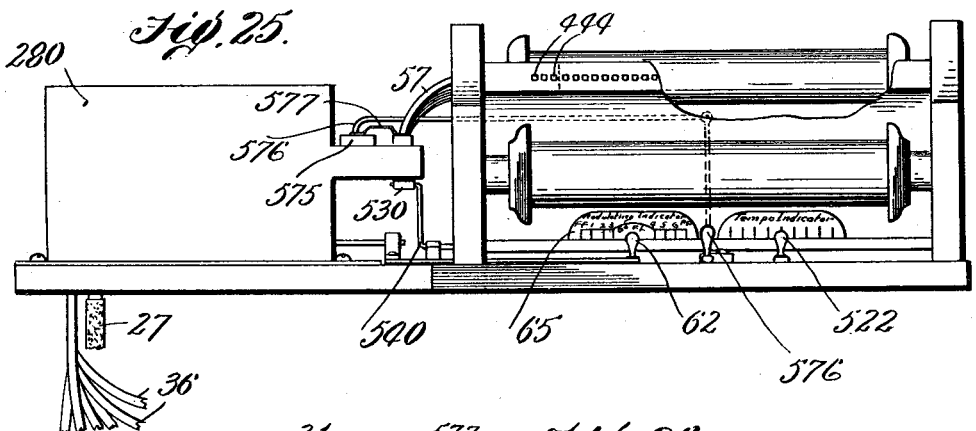
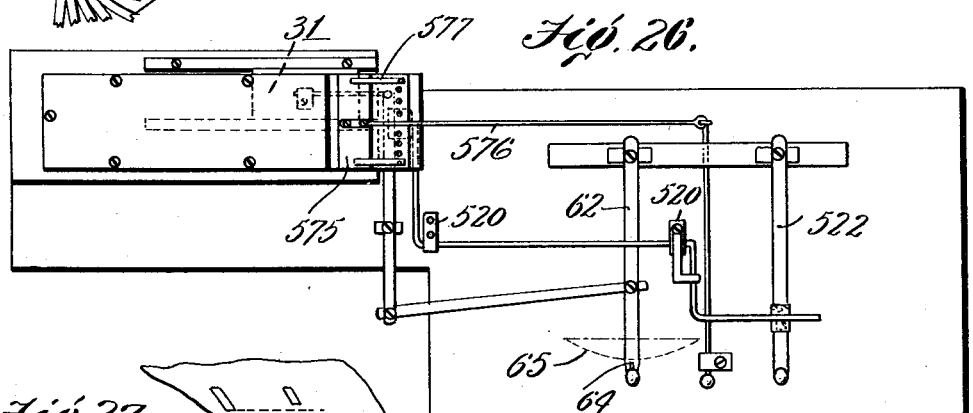
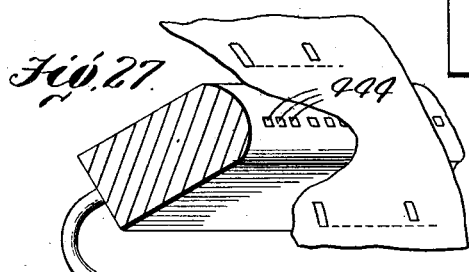
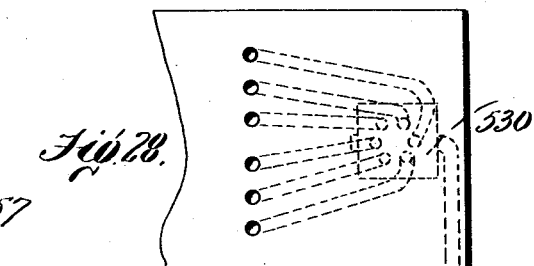
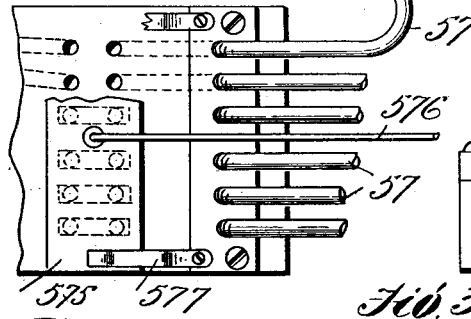

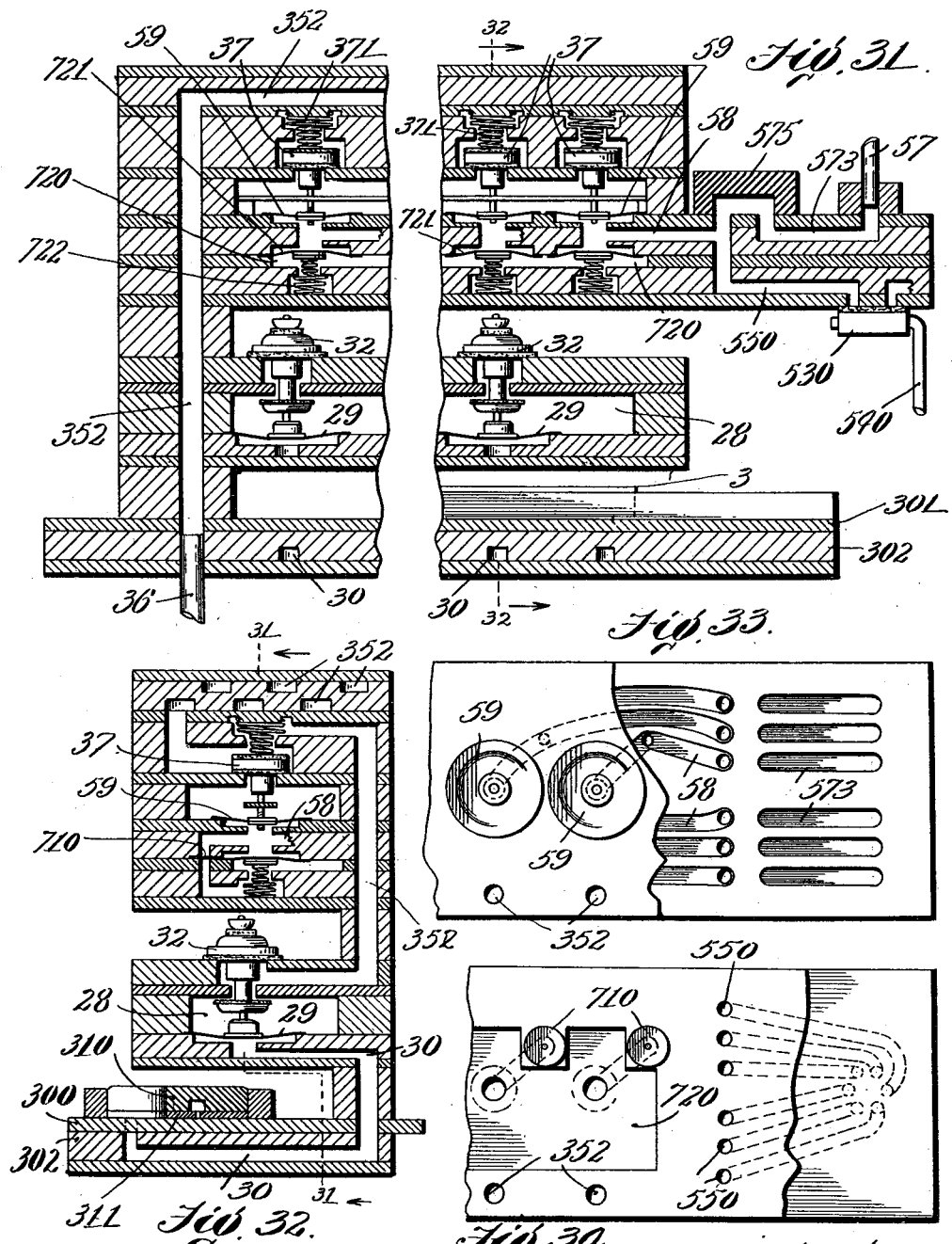

UNITED STATES PATENT OFFICE.

PETER WELIN, OF NEWCASTLE, INDIANA, ASSIGNOR, BY MESNE ASSIGNMENTS, TO THE KRELL AUTO-GRAND PIANO CO. OF AMERICA, OF CONNERSVILLE, INDIANA, A CORPORATION OF INDIANA.

PNEUMATICALLY-CONTROLLED MUSIC-PLAYING DEVICE.

1,063,898. Specification of Letters Patent. Patented June 3, 1913.

Application filed February 5, 1907. Serial No. 355,863.

*To all whom it may concern:*

Be it known that I, PETER WELIN, a citizen of the United States, residing at Newcastle, in the county of Henry and State of Indiana, have invented a new and useful Pneumatically - Controlled Music - Playing Device, of which the following is a specification.

This invention relates to that class of music playing devices which, whether in the form of automatic pianos or the like, or in the form of separate devices for playing ordinary musical instruments, are operated pneumatically. I have heretofore filed several applications on inventions relating to this type of instrument as follows: Ser. No. 351085 filed January 7, 1907; Serial No. 290,749, filed December 7, 1905; Serial No. 351.086, filed January 7, 1907; Serial No. 351,087, filed January 7, 1907; and Serial No. 351,088, filed January 7, 1907.

The objects of this invention are to improve instruments of that character, and to provide means whereby the accenting effect in such an instrument can be controlled from the music sheet, or from any other device for the same purpose, without interfering with the manual operation of the accenting mechanism, this being accomplished, in an instrument having a tracker-bar over which a music sheet passes, by the employment of additional channels in the tracker-bar and corresponding additional perforations in the music sheet.

Another object is to provide means for cutting out the automatically operated mechanism for controlling the accenting effect so that the same instrument may be used with music sheets not cut for this purpose.

Another object of the invention is to provide a more convenient arrangement of the bleeder passages in the modulating valve box.

Further objects will appear hereinafter.

This invention can be used on automatic musical instruments and on players for musical instruments.

Reference is to be had to the accompanying drawings which illustrate practicable modes in which the above mentioned principles can be applied to automatic pianos and to piano playing devices and in which, Figure 1 is a front elevation of a portion of a combination piano showing the tracker box and modulating valve box and the channel board with connections. Fig. 2 is a plan of the modulating valve box showing a sliding valve and connections for operating the same and also illustrating a switch valve box and its connections and other features of the invention. Fig. 3 is a plan of mechanism for cutting out the extra connections from the additional channels of the tracker-bar showing a portion of the tracker-bar in perspective. Fig. 4 is a sectional view on the line 4—4 of Fig. 3. Fig. 5 is a plan of the switch valve box. Fig. 6 is a sectional view of the same on the line 6—6 of Fig. 5. Fig. 7 is a bottom plan view showing the openings to the outer air, the valve not being shown in this figure. Fig. 8 is a plan of the sliding valve with portions removed to show interior construction. Fig. 9 is a similar view with the valve in a different position. Fig. 10 is a bottom plan of the top plate of the sliding valve. Fig. 11 is a plan of the second plate of the modulating valve box, the top plate being removed. Fig. 12 is a plan of certain portions of the modulating valve box with the horizontal plates broken away in different planes to show the relative positions of the parts. Fig. 13 is a plan of a plate on the modulating valve box below the lowest plate that appears in Fig. 12. Fig. 14 is a plan of the plate located below that shown in Fig. 13. Figs. 15 and 16 are plans of other plates of the modulating valve box. Fig. 17 is a longitudinal vertical sectional view taken on the line 17—17 of Fig. 19. Fig. 18 is a horizontal sectional view on the line 18—18 of Fig. 17. Figs. 19 and 20 are vertical sectional views on the lines 19—19 and 20—20, respectively, of Fig. 17. Fig. 21 is a longitudinal sectional view of a preferred form of one of the operating pneumatics showing the interior construction and connections. Figs. 22 and 23 are plans of certain plates of the valve box shown in Fig. 21. Fig. 24 is a diagrammatic view indicating certain features of the invention and showing how the several parts may be connected together. Fig. 25 is a view similar to Fig. 1 showing a construction which can be adopted when this invention is to be applied to a piano player. Fig. 26 is a plan similar to Fig. 2 as applied to a piano player. Fig. 27 is a plan of mechanism for cutting out the extra connections from the additional channels of the tracker-bar showing a portion of the tracker-bar in perspective, as applied to a piano player. Fig. 28 is a plan of the switch valve box for a piano player. Fig. 29 is a bottom plan view of a part of the switch valve box showing the air inlet passages. Fig. 30 is a side elevation of the switch valve box showing the operation of the valve therefor. Fig. 31 is a longitudinal vertical sectional view of the modulating valve box for a piano player with the switch valve box forming a part thereof and taken on the line 31—31 of Fig. 32. Fig. 32 is a sectional view on the line 32—32 of Fig. 31, and Figs. 33 and 34 are plans of two plates of a modulating valve box of a piano player.

By reference to Fig. 24, the general characteristics and operation of a device in a simple form exhibiting the principles of this invention in connection with that of my above mentioned application can be observed. This figure, while especially designed for the application of the invention to an automatic or combination piano, exhibits the same with sufficient breadth to indicate its application to a piano player or other such instrument.

A suction tube 27 connects a main windchest with a suction chamber 28 of the modulating valve box. In this chamber are located a series of pneumatics 29, one for each note or series of notes as desired. In the present instance, one of these pneumatics is shown for each octave. These pneumatics are supplied as desired with atmospheric air through channels 30 individually controlled by a valve 31 or the like to permit the admission of air to any desired one or more of the pneumatics. When air is admitted, it raises a pneumatic and operates the corresponding valve 32. The rise of this valve admits atmospheric air through a passage 33 to a chamber 34 and a passage 35 to a tube 36. The passage 35 is controlled by a valve 37 in each instance. If this valve is open, as shown in Fig. 24, the atmospheric air will pass through the passage 35 and along a corresponding tube 36 to a channel or series of channels 38 which, if a plurality of notes are to be modulated simultaneously, are connected together in sections with a plurality of modulating channels 39 which, in the form shown, are connected with the pneumatics of an octave. The air passing through the channels, 36, 38 and 39 operates a pneumatic 40 to lift a throttle valve 41 located in a suction chamber 42 to throttle the passage between this chamber and the striking pneumatic 43. The operation of this pneumatic is controlled by the music sheet or the like, the perforations of which admit air through tubes 44 to primary pneumatics 45. In each case this raises a valve 46 to cut off the suction from a channel 47 and admit atmospheric air thereto so as to raise a secondary pneumatic 48 and its valve 49. This valve connects the striking pneumatic 43 for that note with the suction chamber 42 as stated.

It will be observed that with the construction specified the throttle valves of all the notes of an octave will be set simultaneously so that when their striking pneumatics are connected with the suction chamber 42 by the action of their respective pneumatics 48, the air passage will be throttled to soften or modulate the tone. All this is in accordance with my above identified application. If, while this state of affairs continues, it is desired to set the connections so that one or more of the notes of that octave will be accented when sounded, a controlling arrangement for a portion of the modulating connections is operated to set them to operate the notes. This comprises a lever 52 which is manipulated to force down a valve 53 in a switch valve box 54 so as to admit atmospheric air through a plurality of openings to a corresponding number of passages 55 therein. The depression of the valve consequently admits air to each one of the passages 55 and it passes through each of the tubes 56 to switch valve chambers 58, each of which is provided with a pneumatic 59, each one adapted to operate one of the valves 37 to close it on admission of air to the proper chamber. Consequently, upon the taking place of this operation a portion of the above described modulating connections is operated so that all these valves are simultaneously operated to cut off the air from the passages 35 and connect them directly with the suction chamber 28. This prevents the softening action while the lever 52 remains depressed although the position of the modulating valves 32 is not changed. By the proper construction and operation of the sliding valve 31 and by the manipulation of the lever 32, any desired octave or other set of notes, according to the construction of the instrument, can be softened or modulated when they are operated from the tracker-bar in the usual way. Also, if desired, any one or more notes of those which are softened can be accented by manual manipulation without interfering with the operation of the modulating mechanism. If it is desired to operate the several pneumatics 59 automatically, and control the operation of the same by perforations in the music sheet, the tracker-bar is provided with a number of additional channels 444, these being connected by tubes 57 with the tubes or passages 56. Means is preferably provided whereby the air will pass into the additional channels in the tracker-bar slightly in advance of its passage into the corresponding note channels. This may be accomplished by setting the corresponding perforations in a music sheet slightly ahead, by making the supplementary channels larger as shown, or by off-setting the channels in the other direction as is indicated in Fig. 24. The operation of this device when air is admitted through one of the channels 444 will be obvious. The effect is substantially the same as that of operating the lever 52 except that only one of the pneumatics 59 is operated instead of all of them.

It will be seen that as the passages 55 terminate in the bottom of the switch valve box, they are entirely out of communication with each other when the valve thereof is closed. The principles of the invention can be carried out in a very simple manner and for illustration of a practical construction thereof, reference is to be had to the other figures.

By reference to Figs. 1 and 2, it will be seen that the modulating valve box 280 as described in my above mentioned application is located adjacent to the tracker-box 440. The tracker-box may be of any desired construction but is shown as provided with a glass front plate 441 on which is located a scale 442 above the tracker-bar so that the perforations in the paper can readily be seen through the scale and their position relative thereto observed. As the invention is illustrated in that form in which each passage 38 connects with the pneumatics of an entire octave, the scale is shown as indicating octaves.

The operation of the sliding valve 31 is shown as accomplished through a rock shaft 60 connected with the sliding valve by link work 61 and connected with an operating lever 62. The rock shaft 60 is also connected by links 63 with a pointer 64 passing over a curved indicator 65 on the tracker-box and showing the position of the sliding valve and the octaves or other sets of notes which are modulated.

The sliding valve 31 can be constructed in many ways and the position of the openings in the top of the modulating valve box which communicate with the modulating valve pneumatics will, of course, modify the construction of the valve. It is shown, however, in Figs. 8, 9 and 10, as consisting of two plates; an imperforate top or cap plate 310 and a perforated bottom plate 311. The modulating valve box is also provided with a top plate 300 and in this plate are two series of openings or passages, there being six in each series in the present case as there are six octaves to which they are to connect. The passages of one series are designated $30^a$, $30^b$, $30^c$, $30^d$, $30^e$, and $30^f$, respectively. Those of the second series are designated $30^A$, $30^B$, $30^C$, $30^D$, $30^E$, and $30^F$. Each of the pneumatics 29 is connected with one passage in each series. The passages of one series are so located that on the travel of the valve they will all be either covered or exposed simultaneously. Therefore, if the valve has a straight sliding motion as shown, and a straight end, they are located in a straight line but they are shown as located in two lines and the valve 31 as being provided with notches 312 for admitting air to those in the rear row, at the same time that air is admitted to those in the other row, the position of the pasages and shape of the end of the valve being mutually dependent on each other, and on the kind of motion imparted to the valve 31.

When the valve is in the position shown in Fig. 9, all the passages $30^a$, $30^b$, etc., are exposed to the air. If the valve now moves to the left, they will each first be closed by the valve and on further movement of the valve in the same direction, the passages $30^a$, $30^b$, $30^c$, $30^d$, and $30^e$, will be bled by being located under a series of perforations 314 in the bottom plate 311 of the valve. These perforations are of different lengths to provide for keeping them in communication with the several passages in the plate 300 different periods of time and they all communicate with a channel 315 in the lower side of the top plate 310. This channel also communicates with another perforation 316 in the bottom plate 311 which, throughout the travel of the valve, is located over a passage 301 in the plate 300 which communicates with the suction chamber 28 so as to bleed the several pneumatics 29 when the valve is in the proper position therefor.

In the position just described all the pneumatics except one will be placed in communication with this passage 301 and restored to their normal condition ready for further operation. The reason the passage $30^f$ is not bled at this time is because a notch 313 in the valve now comes into registration with the passage $30^F$ which is connected with the same pneumatic as the passage $30^f$. Consequently, the pneumatic connected with these two passages is open to the air and that octave is modulated.

In the form shown, the passages of the second series are arranged in two parallel lines which are in the line of motion of two perforations 317 and 318, in the bottom plate 311 which communicate with the passage 315; whereby all the pneumatics can be bled in an obvious manner. On further movement to the left the passage 30ᶠ is exposed to the air while that perforation 314 with which the passage 30ᵉ was connected now passes beyond that passage and the bleeding of the pneumatic 29 connected with the passages 30ᴱ and 30ᵉ is stopped. As the valve continues to move to the left, these operations are repeated with the other passages and pneumatics. When the passage 30ᶠ is closed by the advancing side of the notch 313, it comes into communication with the perforation 317 in the bottom plate 311, to bleed that pneumatic. The corresponding perforation 318 successively connects the perforations 30ᴱ and those in line therewith with the channel 315 in the same way.

It will be seen that as the valve moves, the indicator 64 moves with it and shows which octaves are modulated. In the form shown, this indicator when on the numeral 6 indicates that the sixth octave alone is modulated, but when on the numeral 5 it indicates that both the fifth and sixth are modulated and when on the numeral 4 it shows that all three are connected in this manner. In the spaces between the numerals 4 and 3, there will be positions in which octaves 4 and 5 and then octaves 3 and 4 are modulated. The same state of affairs occurs on the other side. When the pointer is beyond the scale on the left, it indicates that all the passages of one series are closed and there is no modulation, but when beyond the scale on the right, it indicates that they are all open, the slide being in the position shown in Fig. 9, and all the notes of the instrument modulated.

The passage of the air from the two series of passages represented by the characters 30ᵃ and 30ᴬ, etc., to the pneumatics 29 will now be traced. Fig. 11 shows a plate 302 containing continuations of the two series of passages in the plate 300, these continuations being given the same reference characters as they are in the plate 300. Channels are provided either in the top or bottom of the plate 302 for connecting the passages of the two series. For example, a channel 3ᵃ connects the passages 30ᵃ and 30ᴬ. Channels 3ᵇ, 3ᶜ, 3ᵈ, 3ᵉ, and 3ᶠ are also provided for connecting the other passages. Some of these channels are located entirely on one side of the plate, while others are located partly on one side and partly on the other, the two parts being connected by a perforation. Each of these channels is also so formed as to communicate with one of the series of six channels 30. It will be seen, therefore, that through the series of channels 3ᵃ, 3ᵇ, 3ᶜ, 3ᵈ, 3ᵉ, and 3ᶠ, which are connected with the pneumatics 29, all of the passages of the two sets in the top plate 300 are put into communication with their respective pneumatics. The passage 301 is located directly over, and terminates in, a channel 303 in the plate 302 which communicates with a perforation 304. This perforation 304 communicates with the suction chamber 28.

Below the plate 302 are a series of parallel plates 281, 282, 283, 284, 285, 286, 287 and 288. These plates, when properly located, together with the plates 300 and 302, constitute the upper part of the modulating valve box. By reference to Fig. 19, it will be seen that each of the passages 30, extends through all of these plates except 287 and 288. Each passage 30 communicates with the corresponding pneumatic 29 which is supported on the top of the plate 286. The suction chamber 28 is located in the plate 285 and bounded on the top and bottom by the plates 284 and 286. The former of these plates has a passage for the valve 32 to connect the suction chamber with the passage 35 above mentioned, which is located in the plate 284. The plate 285 has a channel communicating with the passage 304 which thus leads to the suction chamber.

In the plate 282 is located the chamber 34 which is in communication with the outside air through the passages 33. Although in Fig. 24 a separate one of these chambers and passage is shown for each modulating valve, it is preferred to construct the same in the form of a single long chamber extending throughout the main part of the length of the plate 282.

By reference to Fig. 24, it will be seen that the passage 35 communicates with one of the tubes 36 except when the passage is closed by the switch valve 37. The construction of the various elements making up this part of the apparatus can be varied within wide limits but a convenient way in which the various passages and other features can be located is illustrated in the drawings.

Into the passages 351 of the plate 282 project a series of springs 371 carried by the plate 281 each for engaging a valve 37 and normally assisting in holding it down on its lower seat. The plate 282 is provided with perforations which constitute portions of the passages 35. This is illustrated in the form of a series of direct perforations 351 each communicating with a channel 352 communicating with the passage 35 and in the top of the plate 282 these perforations 351 are connected with slots 353 which communicate with perforations 354 which in turn communicate through perforations in the plate 283 with the main parts of the passages 35. The plate 283 also contains continuations of the perforations 351 and a series of perforations 355, over which the upper part of the valve 32 seats. The plate 284 also contains the perforations or channels 351 and 354 and the main parts of the passages 35 which extend upwardly through the perforations 355 through which the valve 32 passes. The passages 35 are connected with the suction chamber by perforations 356. The next plate below; namely, that numbered 285, as has been stated, contains the suction chamber 28 into which perforations 356 enter and it also communicates through perforations 357 with the passages 352 in the plate 284. These passages 352 extend down through the plate 285 as well as through all the plates below it and as has been said, the passage 304 extends into the notch 305 in the plate 285 through which it connects with the suction chamber. This plate also has a channel 270 communicating with the suction pipe 27.

The parts just described are substantially the same as disclosed in my above mentioned application. The plate 286, in the present case, contains perforations constituting part of the passages 30, and 352 and of the chambers 58, channels in the under side of this plate also constituting part of the passages 30. The next plate numbered 287 is merely provided with two sets of six perforations each, constituting portions of the passages 352 and chambers 58. The same is true of the plate 288, and it is provided with six channels on its upper and lower faces extending from the passages 352 downwardly that they may communicate with the tubes 36. It also has channels constituting part of the chambers 58.

The chambers 58 and passages 352 extend through a series of plates 70, 71, 72, 73, 74, 75, 76, 77 and 78, at the latter of which the passages 352 are connected with tubes 36 and the chambers 58 are divided, each being connected with a tube 56, and also with a tube 57 which communicates with one of the extra tracker channels 444 as has been stated. These tubes 57 extend from a block or plate 570 on the modulating valve box to a channel plate 571 (see Figs. 2, 3 and 4) which has two series of separate channels 572 and 573, terminating in the top of the plate 571 at a short distance from each other. The channels 573 are connected at their other ends through the tubes 57 with the tracker channels 444. The breaks in the passages are opened or closed by a sliding valve 575 having passages adapted to individually connect the passages 572 and 573 when the valve is in one position and to disconnect them when in any other position. This valve is controlled by a manually operative rod 576. Therefore the connections for the automatic operation of the throttle valves by the music sheet can easily be cut off to permit the device to be used with paper not especially cut for it. A spring 577 holds the valve to its seat.

The tubes 56 are connected with the switch valve box 54 in a manner indicated in Figs. 5 and 6. The construction of this box has been indicated by the description above given and the manner of operating the lever 52 is all that need be described. As in my above mentioned application this lever is raised and lowered to operate the valve 53 instead of being swung on a vertical pivot as is the case with most of the levers employed on instruments of this character. It is shown in Fig. 2 as being pivoted in bearings 520 and as having an arm 521 which is adapted to be operated by the raising and lowering of any desired one of the levers employed for regulating the instrument. It might be operated by the lever 62 but it is shown as operated by the tempo lever 522, the lever being moved to operate the valve in a plane parallel with the axis of the pivot on which it swings to regulate the tempo.

The switch valve box is not provided with separated connections to the suction chamber, but the modulating valve box has a bleeding device for each chamber 58 contained in the plates 71, 72 and 73, which will now be described. These plates contain channels or passages 730 connecting the chambers 58 with a suction chamber 720. In order to restore the pneumatics 59 to their normal condition under suction after air has been admitted and they have been disconnected from the outer air the following mechanism is shown. In each of the channels 730 which is directly connected with the suction chamber 720 is a pin-hole disk 710, providing a restricted opening. In the chamber 720 are pneumatics 721 from which depend valves 722 each provided with a spring 723 for assisting in returning it to the position which it occupies when there is no air on the pneumatic. The top of the pneumatic communicates with the chamber 58 through a passage 711. The chamber 720 in which the valves are located communicates with the suction chamber 28 through a passage 724 and is always under suction.

When an impulse of air passes into a chamber 58 and channel 730 it also passes into a passage 711 and operates the pneumatic 721 to close the valve 722 and cut channel 730 off from communication with suction and permits the impulse of air to act on the pneumatic 59 in the manner above described. After the channel in the tracker-bar or switch valve box is closed, the natural leakage around the valve 722 will relieve the same so that the spring 723 can push the valve 722 away from its seat and restore the elements to normal condition when the channel 730 will again be connected with the suction so as to bleed the chamber 58. One of these valves is of course used for each of the chambers 58.

The channels 38 are located in a channel board 380 and are shown in the form of series of connected channels each of the series communicating in this instance, with eleven valve boxes and striking pneumatics. This communication is made in each instance through one of the passages 39. This channel board is also provided with one perforation 420 for each valve box, communicating with the suction chamber 42. These various passages communicate with the valve boxes 430 in any desired manner. By reference to Figs. 21, 22 and 23 a practical manner of connecting these elements will be seen. The operation of this part of the device has been sufficiently described with reference to Fig. 24. One feature, however, is indicated in detail in this figure which is not shown in Fig. 24. This is a resilient means for controlling the operation of the throttle valve 41 and an adjustment therefor. This is constructed as follows: A spring 66 is provided for normally holding the valve 41 down and preventing its rising far enough to throttle the air passage. As these springs are liable to lose part of their resiliency in use, means is provided for adjusting the tension thereof. For this purpose each spring 66 is so formed that the part extending from the stationary end of the spring is on an incline and a block 67 is mounted between this incline and the wall of the passage in which it is located, this block being adapted to limit the motion of the spring in one direction. Means is provided for shifting this block back and forth to adjust the tension of the spring. This means is shown in the form of a screw 68 extending out of the valve box so that it can be manipulated from the outside. The screw 68 is held in adjusted position by means of a nut 69 thereon which is in turn held by a clamp 70 secured in position by the bolts by which the valve-boxes are fastened, as set forth in my above mentioned application.

In Figs. 25 to 34, I have illustrated a construction in which this invention is applied to a piano player. In these figures the same reference characters refer to corresponding parts and the operation is similar to that described. In this case, however, the sliding valve is mounted below the main part of the modulating valve box and the switch valve box instead of being separate, is mounted directly on the modulating valve box. Although the construction of the switch valve box is somewhat modified, its operation is the same. The valve 530 is operated by a lever 540 in a way which is substantially a reversal of that described above, the valve seating upwardly as before but the lever being connected directly with it. The passages 550 have the same action as the passages 55 and are connected with the chambers 58 in a similar manner. The sliding valve 310 is mounted on the plate 300 which is located above the plate 302 that communicates upwardly instead of downwardly with the suction chamber 28. In this case, this suction chamber 28 is separate from the valve chambers in which the valves 37 are located. The bleeding arrangement is substantially the same as that above described.

Although it is believed that the operation of the piano player will be obvious from what has been stated, a brief description thereof will be given. The modulating valve box 280 has a suction chamber 28 connected with a source of air tension. In this chamber are located a series of modulating pneumatics 29 one for each note or series of notes, as desired. In the present instance one of these pneumatics serves for the notes of an entire octave but this may be varied in the construction of the instrument in accordance with the conditions existing. These pneumatics are supplied as desired with atmospheric air through channels 30 individually controlled by the valve 310 which is manually operative to admit air to any desired one of the pneumatics. When air is admitted it raises the pneumatic 29 and operates a valve 32, the raising of which admits atmospheric air through a series of passages 33 each of which communicates with a channel 35 leading to a pneumatic for lifting a throttle valve located in another suction chamber of the valve box to throttle the passage between this chamber and the corresponding striking pneumatic, which is not shown in this modification.

In the construction specified, the passages to operate an entire octave are thus simultaneously throttled. The operation of the striking pneumatic is preferably controlled by the music sheet in the ordinary way. It is to be observed that the throttle valves of all the notes of an octave or other series are simultaneously set so that when their striking pneumatics are connected with the suction chamber by the action of the usual mechanisms, the air passage will be throttled to soften or modulate the tone. If, while this state of affairs continues, it is desired to accent one or more notes of that octave as it is played the lever 522 is manipulated to operate the switch valve 530 and open each of the passages 550 leading to all of the switch valve suction chambers 58 and open each to reëstablish communication between the suction chamber 28 and all of the passages 36, thus preventing the softening action while this lever is operated, although the position of the modulating valves 37 and their pneumatics 59 is not interfered with in any way. This, obviously, is done by manual manipulation. If it is desired to control this action by the music sheet, the tracker-bar is provided with additional channels 444 and the music sheet with corresponding perforations. The air is then admitted through any desired one of these channels by means of a music sheet perforation to one of the channels 550 which operates the desired throttling valve pneumatic 59 to open the valve and reëstablish communication between the suction chamber 28 and the corresponding passage 36, thus preventing the softening action on this section or octave. The suction chambers 58 are bled by means of a series of bleeding devices similar to those described.

While I have illustrated and described two particular embodiments of my invention, I am aware that many modifications may be made therein without departing from the spirit of the invention as expressed in the claims. Therefore, I do not wish to be limited to the particular construction shown but What I do claim is:—

1. In a music playing device, the combination of means for playing a musical composition, a plurality of means for modulating or softening series of notes, means for controlling said playing means to accent all the notes while the softening means remain in operative condition, and means independent of the softening means for operating said controlling means individually.

2. In a music playing device, the combination of means for playing a musical composition, a plurality of means for modulating or softening series of notes, means for controlling said playing means to accent the notes of all of said series while said softening means remain in operative condition, manually controlled means for simultaneously operating all the controlling means, a tracker, and means operative from channels of the tracker for operating each of said controlling means independently of the rest and of the softening means.

3. In a music playing device, the combination of a tracker-bar, means controlled from the tracker-bar or the like for operating a striking pneumatic for each note, throttle valves, manually controlled means for setting a series of said throttle valves to soften their respective notes when operated from the tracker-bar, means coöperating with said setting means for operating the throttle valves to accent a note while parts of the manually operated means remain in position for modulating all the notes of the series, means operative from channels of the tracker-bar of the device for controlling said accenting means, and means for rendering the last named means inoperative, whereby the device can be used with music sheets not cut for that purpose.

4. In a music playing device, the combination of a suction chamber, a plurality of series of throttle valves, pneumatics therefor, a modulating valve for each of said series adapted to connect the throttle valve pneumatics of its series with the suction chamber or the outside air, a plurality of switch-valves, one for each series simultaneously operative to connect all of the throttle valve pneumatics with the suction chamber independently of the position of the modulating valves, and independent means for operating any one of said switch valves independently of the others to connect the corresponding throttle valve pneumatics with the suction chamber.

5. In a music playing device, the combination of a switch valve box having a plurality of independent passages each having an opening to the outer air, a manually operated valve adapted to close or open all of said passages simultaneously, a tube extending from each of said passages, a modulating valve box having suction chambers one connected with each of said tubes, a pneumatic in each suction chamber, a switch valve for each of said pneumatics, a second set of tubes each of which connects with one of said suction chambers, and a tracker-bar having channels individually connected with the second set of tubes.

6. In a music playing device, the combination of a modulating valve box having a suction chamber, a series of switch valves therein, a pneumatic for each switch valve, an additional suction chamber for each of said pneumatics, a switch valve box having a plurality of channels, one connected with each of said suction chambers, a valve for closing or opening all of said channels simultaneously and a tracker bar having ordinary note channels, and additional channels each directly connected with one of said suction chambers, whereby the switch valve pneumatics may be operated automatically from the tracker bar or manually and simultaneously from the switch valve box.

7. In a modulating valve box, the combination of a series of suction chambers, a pneumatic in communication with each of said suction chambers, a valve connected with each pneumatic, a suction chamber in which each valve is located, and passages, one leading from each of said last named suction chambers, normally closed by one of said valves and communicating with said first named suction chamber through a restricted opening.

8. A modulating valve box having a suction chamber, a second suction chamber, a pneumatic located between said suction chambers, a valve carried by said pneumatic, and a spring for normally forcing said valve from its seat, said box having a passage controlled by said valve for connecting said suction chambers through a restricted opening.

9. A bleeder device for a pneumatic, comprising a suction chamber having a passage therefrom, a second suction chamber or passage communicating with the first named passage through a restricted opening, a valve for closing said first named passage, a spring for normally lifting said valve from its seat, and a pneumatic connected with said valve and having a surface in position to be operated upon by air entering the second suction chamber or passage to close the valve and cut off said second suction chamber or passage from the first named suction chamber.

In testimony whereof I have hereunto set my hand, in the presence of two subscribing witnesses.

PETER WELIN.

Witnesses:
 Jas. P. Reeves,
 Edward B. Pfau.

Copies of this patent may be obtained for five cents each, by addressing the "Commissioner of Patents, Washington, D. C."